United States Patent
Bain et al.

(10) Patent No.: US 7,472,369 B1
(45) Date of Patent: Dec. 30, 2008

(54) EMBEDDING IDENTIFICATION INFORMATION ON PROGRAMMABLE DEVICES

(75) Inventors: Peter Bain, Ottawa (CA); Kerry S. Veenstra, Santa Cruz, CA (US); Timothy P. Allen, Santa Cruz, CA (US); Aaron Ferrucci, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 558 days.

(21) Appl. No.: 10/861,990

(22) Filed: Jun. 3, 2004

(51) Int. Cl.
*G06F 17/50* (2006.01)

(52) U.S. Cl. .............. 716/16; 716/17; 716/18

(58) Field of Classification Search ........... 716/4–5, 716/16–18; 326/38–41; 713/189, 107, 163
See application file for complete search history.

(56) References Cited

U.S. PATENT DOCUMENTS

| | | | |
|---|---|---|---|
| 6,292,762 B1 * | 9/2001 | Moll et al. ............ 703/1 |
| 6,809,552 B1 * | 10/2004 | Pi et al. ............ 326/41 |
| 7,028,281 B1 * | 4/2006 | Agrawal et al. ............ 716/12 |
| 7,111,214 B1 * | 9/2006 | Chaudhary et al. ............ 714/725 |
| 7,165,229 B1 * | 1/2007 | Gathoo et al. ............ 716/1 |
| 2002/0199110 A1 * | 12/2002 | Kean ............ 713/189 |
| 2003/0033588 A1 * | 2/2003 | Alexander ............ 717/107 |
| 2007/0035329 A1 * | 2/2007 | Madurawe ............ 326/40 |

OTHER PUBLICATIONS

Altera Corporation, "OpenCore Plus Evaluation of Megafunctions", Application Note. 320, AN-320-1.2, 8 pages.
Altera Corporation, "OpenCore Evaluation of AMPP Megafunctions", Application Note 343, AN-343-1.0, 6 pages.

* cited by examiner

*Primary Examiner*—Paul Dinh
(74) *Attorney, Agent, or Firm*—Weaver Austin Villeneuve & Sampson LLP

(57) ABSTRACT

Methods and apparatus are provided for embedding identification information on a programmable chip. Parameterizable components are selected for implementation on a programmable chip. Information relating to the parameterizable components is embedded on the programmable chip by storing the information using mechanisms such as look up tables associated with logic elements. Information can be used to identify types of components, versions of components, parameter sets, and other data associated with components implemented on the programmable device.

29 Claims, 9 Drawing Sheets

EMBEDDING IDENTIFICATION INFORMATION ON PROGRAMMABLE DEVICES

BACKGROUND OF THE INVENTION

1. Field of the Invention

The present invention relates to implementing a programmable chip. In one example, the present invention relates to methods and apparatus for efficiently providing identification information on a programmable chip.

2. Description of Related Art

Hardware devices such as programmable logic chips can include a variety of standardized components, parameterizable components, and customized logic. Some of the components can be obtained from intellectual property (IP) core libraries. In many instances, a user selects components from an IP core library, provides parameters to customize various components, and adds customized logic. Logic is then passed to various synthesis and place and route tools before implementation on a programmable chip. The implemented device can include a variety of components and custom logic blocks.

However, mechanisms for determining the type of components and the parameter sets associated with the components on a programmable chip are limited. In some examples, few mechanisms are available to determine the version of a particular component on a device. Without identification information, the user has limited ways of knowing whether the correction component or system is being used. The user also has few mechanisms available to authenticate or verify a particular system configuration.

Consequently, it is desirable to provide improved methods and apparatus for identifying particular components implemented on a programmable chip.

SUMMARY OF THE INVENTION

Methods and apparatus are provided for embedding identification information on a programmable chip. Parameterizable components are selected for implementation on a programmable chip. Information relating to the parameterizable components is embedded on the programmable chip by storing the information using mechanisms such as look up tables associated with logic elements. Information can be used to identify types of components, versions of components, parameter sets, and other data associated with components implemented on the programmable device.

In one embodiment, a method for implementing a programmable chip is provided. Intellectual property core information identifying a plurality of intellectual property cores for implementation on a programmable chip is received. Parameter information associated with the plurality of intellectual property cores for implementation on the programmable chip is received. An identification sequence is generated. The identification sequence corresponds to the intellectual property core information and the parameter information. The identification sequence is written to a plurality of lookup tables.

In another embodiment, a programmable device is provided. The programmable device includes a plurality of components, an interconnection fabric, and embedded identification information. The plurality of components are implemented using a plurality of lookup tables and associated logic. The interconnection fabric allows communication between ones of the plurality of components. Embedded identification information is associated with the plurality of components. The embedded identification information identifies ones of the plurality of components and version information associated ones of the plurality of components.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Figure 1:
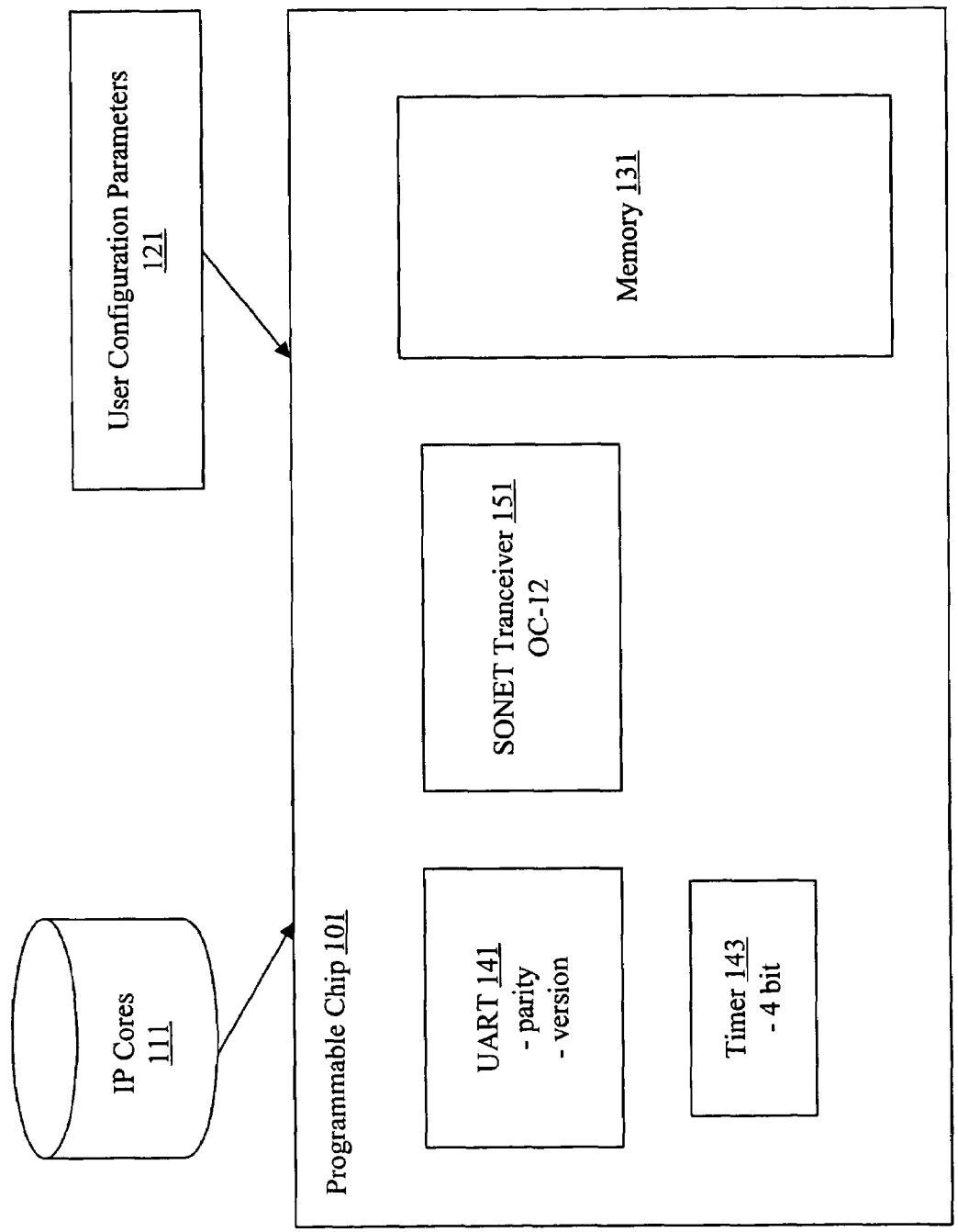
FIG. 1 is a diagrammatic representation showing a programmable chip.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

For example, the techniques of the present invention will be described in the context of particular components and devices. However, it should be noted that the techniques of the present invention can be applied to a variety of types of components and devices. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

A variety of components, mechanisms, and logic blocks can be implemented on a programmable chip. In some examples, components such as peripheral components and peripheral interfaces are selected from library and customized by a user for implementation on a device. Components are also referred to herein as intellectual property cores or IP cores. For example, a universal asynchronous receiver transmitter (UART) may be selected from a library and parameterized to operate at 9600 baud. A parallel input/output (PIO) may similarly be selected and configured to use 3 parity bits. A user can integrate the parameterized components with custom logic to allow implementation of a device for particular needs or purposes.

The implemented programmable device can then be provided on a system board. In many instances, the programmable device has little identification information. The programmable device may only have a serial number identifying a logic device type, or the chip on which the logic is implemented. For example, the serial number may indicate that the programmable device has 1000 logic elements and a 64 kB memory. However, little information is known about the types of components provided on the programmable device. For example, a user may not know what components are implemented on the device, the version of the components implemented on the device, or the parameter set used to customize the components on the programmable device.

In many instances, once components and logic have been synthesized, it is difficult to recover information about the synthesized components and logic. In particular, it is difficult to obtain information about the parameter settings associated with various components or the versions of the particular IP cores. This makes inventory management difficult, as users no longer know if a board with a programmable device has the correct version of an IP core or the proper parameter settings. It also makes customer service or difficult, as a provider does not know the version of various components being used by a customer.

Consequently, the techniques and mechanisms of the present invention embed identification information on a programmable device. The identification information can include information about custom logic, parameter settings, or component versions. In some instances, the identification information can also be used to watermark a particular programmable device designed by including distinctive data without affecting system operation. The identification information can be embedded on the programmable device in a variety of ways. For example, the identification information can be held in memory, registers, or even coded as logic. Each technique for storing identification information has its benefits. For example, storing identification in memory provides for a particular intuitive way for providing identification information.

However, the techniques of the present invention recognize particular benefits associated with storing identification information using logic elements. According to various embodiments, identification information is stored using logic in lookup tables (LUTs). A device typically has unused LUTs. By storing identification using LUTs, unused logic elements can be used to hold identification information without increasing the size of a programmable device memory. Large blocks of memory do not have to be used to store relatively small identification strings.

FIG. 1 is a diagrammatic representation showing a programmable chip. The programmable chip 101 can be implemented using IP cores 101 and user configuration parameters 121. The programmable chip 101 can also include custom logic provided by a user. For example, the custom logic can be used to implement a particular type of signal processing. Custom logic can be used to implement functionality not provided in an IP core library.

According to various embodiments, the programmable chip 101 includes memory 131, a Synchronous Optical Network (SONET) transceiver 151, a universal asynchronous receiver transmitter (UART) 141, and a timer 143. Various components provided on a programmable chip 101 can be selected from an IP core library. The components are also parameterized. For example, the SONET transceiver 151 may be configured to use different optical carrier speeds OC-3 (Optical Carrier Level 3), OC-12, OC-48, or OC-192.

Parameterizable components allow a user to customize IP cores to suit particular needs. In this example, a user selects OC-12. The UART 141 can be configured to operate at a particular baud rate, such as 9600 baud. A timer 143 may be configured as a 4-bit timer versus an 8-bit timer. Each of the various components can also have associated version numbers. For example, the SONET transceiver 151 may be the second version provided for North American markets.

The implemented programmable chip 101 has information associated with its various components and logic that is not readily discernible by user. For example, the user can not easily obtain information about what version of SONET transceiver is being used on the programmable chip. A user may not even know whether the SONET transceiver is configured for North American or European markets.

Consequently, the techniques and mechanisms of the present invention allow the embedding of information onto a programmable device. Information embedded can include version numbers, component parameters, design notes, or any other type of data useful to a user. Any data associated with a programmable device that is embedded on the programmable device in a manner accessible to an end user is referred to herein as embedded information or embedded identification information. According to various embodiments, the embedded information can be bit strings or sequences. Mapping mechanisms available to a user can be used to associate information with particular bit strings. For example, the encoded bit strings can allow a user to determine information such as component IDs, version numbers, parameter sets, etc.

Information can be embedded on a programmable device in a number of ways. In some examples, information can be stored in some form of persistent memory on the programmable device. In one instance, embedded information is provided on a read-only memory (ROM). In other examples, information can be provided in read only registers associated with a processor on the programmable device. The information can also be encoded in random logic and/or stored in lookup tables. Any nonvolatile mechanism can be used for holding embedded information. The embedded information can include multiple bit sequences where each bit sequence is associated with a particular component. The embedded information can also be a sequence identifying all the components and parameters in a system. The bit sequence stored is typically merely a minimal length code that can be mapped to a particular system configuration using some form of mapping mechanism.

However, embedded information code does not necessarily have to encode all of the components and their version and parameter information. To use fewer encoding bits, the embedded information may contain only a subset of the values identifying various components. Consequently, a particular version of a programmable device can be verified even if not all the parameters and versions of the individual components can be obtained. Similarly, the embedded information may only contain a timestamp or watermark to allow for authentication and verification of a programmable device. A watermark or random extraneous bits can be buried in LUTs throughout a design to detect disallowed copying of a programmable device design.

Figure 2:
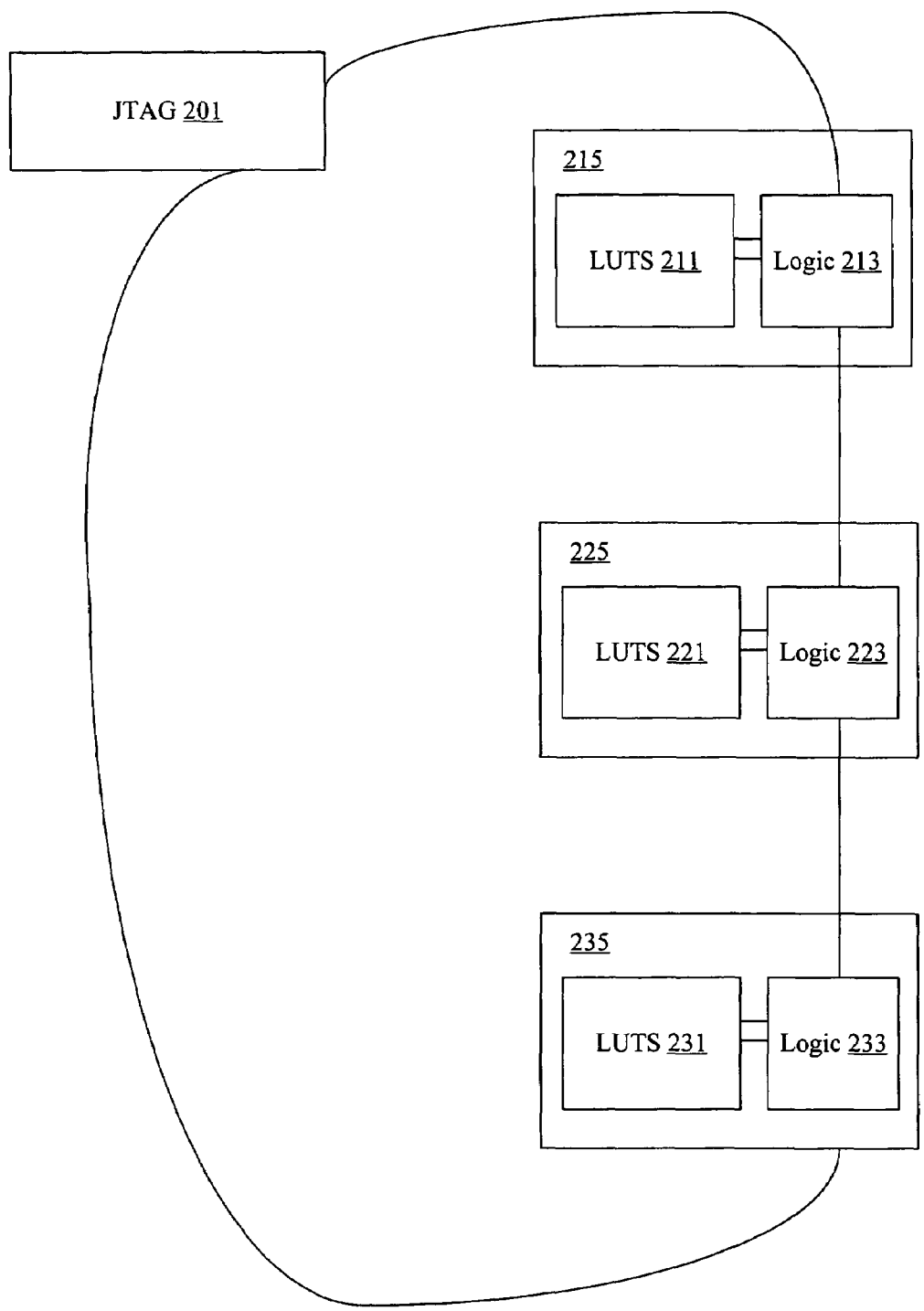
FIG. 2 is a diagrammatic representation showing a JTAG interface.

FIG. 2 is a diagrammatic representation showing one mechanism that can be used to provide embedded information. According to various embodiments, a programmable device allows serial reading of lookup table stored embedded information by using a Joint Test Action Group (JTAG) interface, SignalTap, SignalProbe, or a pin on the programmable device. In one example, JTAG interface is provided at 201 to allow access of various logic blocks without having any applications running on the programmable device. The programmable device also includes components 215, 225, and 235. Component 215 includes lookup tables 211 and logic 213. Component 215 includes lookup tables 221 and logic 223. Component 235 includes lookup tables 231 and logic 233. The JTAG interface 201 accesses each component serially through logic 213, 223, and 233 to retrieve data from lookup tables associated with each component. JTAG provides one convenient serial mechanism for obtaining data. However, a variety of other mechanisms can also be used.

Figure 3:
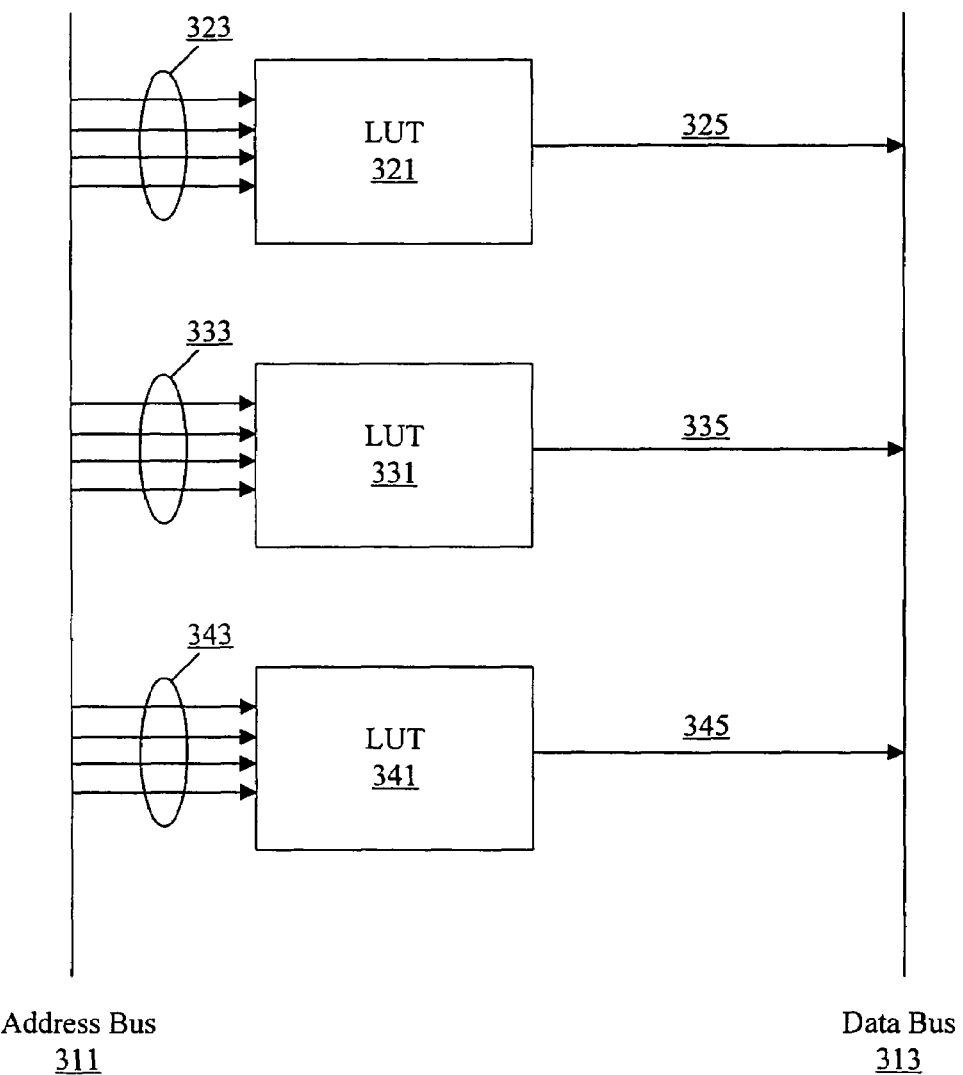
FIG. 3 is a diagrammatic representation showing a plurality of lookup tables coupled to address and data buses.

FIG. 3 is a diagrammatic representation showing a parallel mechanism for obtaining data stored in lookup tables. Lookup tables 321, 331, and 341 are coupled to address bus 311 on the input side and the data bus 313 on the output side. A bus mastering mechanism can be used to access individual lookup tables through lines 323, 333, and 343. Output data can been written on lines 325, 335, and 345. According to various embodiments, embedded information is a 160-bit sequence stored in lookup tables. Identification information can be stored and configured during synthesis and/or place and route.

For example, identification information may be placed in certain reserved or well-known locations. LUTs can be placed to maintain a correct order. Often the design will have multiple IP cores or components and can use one or more identification blocks to hold information about the IP cores. In this case, the IP identification blocks may be chained into a linked list. The end bits of one block can indicate the position of the next block. The position of the first IP identification block can be indicated by a single reserved LUT, or by unused bits in the programming file, or by configuring non-LUT related configuration bits in a particular fashion.

Figure 4:
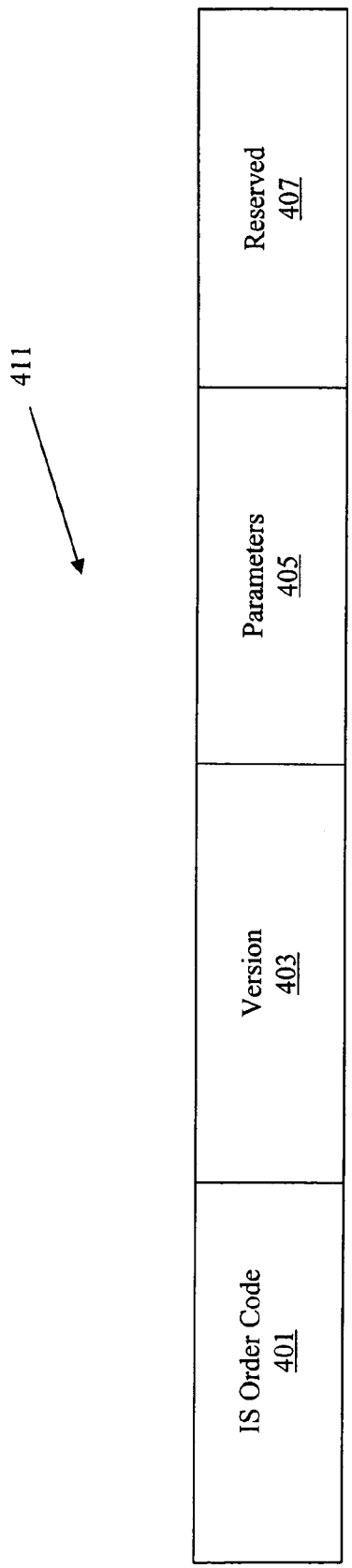
FIG. 4 is a diagrammatic representation showing identification information.

FIG. 4 is a diagrammatic representation showing one example of an embedded information bit sequence. An embedded information bit sequence 411 includes an IP code 405, the version information 403, parameters 405, and space allocated for reserved information 407. In one example, an embedded information bit sequence is used to hold information about a single IP core. In other examples, an embedded information bit sequence holds information about multiple IP cores. The IP code 405 can identify one or more components, such as a timer, or PIO. The version number corresponds to the version of the component. The parameters indicate the selected configuration of a particular component. Reserved information can be used for other information. According to various embodiments, 20 bits are allocated for an IP order code, 12 bits are allocated for a version number, 4-bits are allocated for each 28 parameter values, and 16 bits are reserved for other uses. According to various embodiments, a lookup table has four input lines. A logic element includes a lookup table that operates as a 16×1 RAM and can store 16 bits. Ten lookup tables can then store 160 bits.

Although embedded information can be obtained from lookup tables or other persistent storage on a programmable chip, embedded information can also be obtained by analyzing place and route files or synthesized files associated with a programmable chip. For example, if it is known where embedded identification information is stored, the place and route file can be parsed to extract identification information. Nonetheless, it is typically expected that embedded identification information will be obtained from a programmable chip and particular lookup tables on a programmable chip. By obtaining embedded identification information on lookup tables, extraneous or unused lookup tables can be allocated for holding information while allowing efficient retrieval. Relatively large blocks of memory also do not be wasted on small sequences of bits. For example, a relatively large 16 kB memory block does not have to be allocated for a relatively small 1024 bit string.

Figure 5:
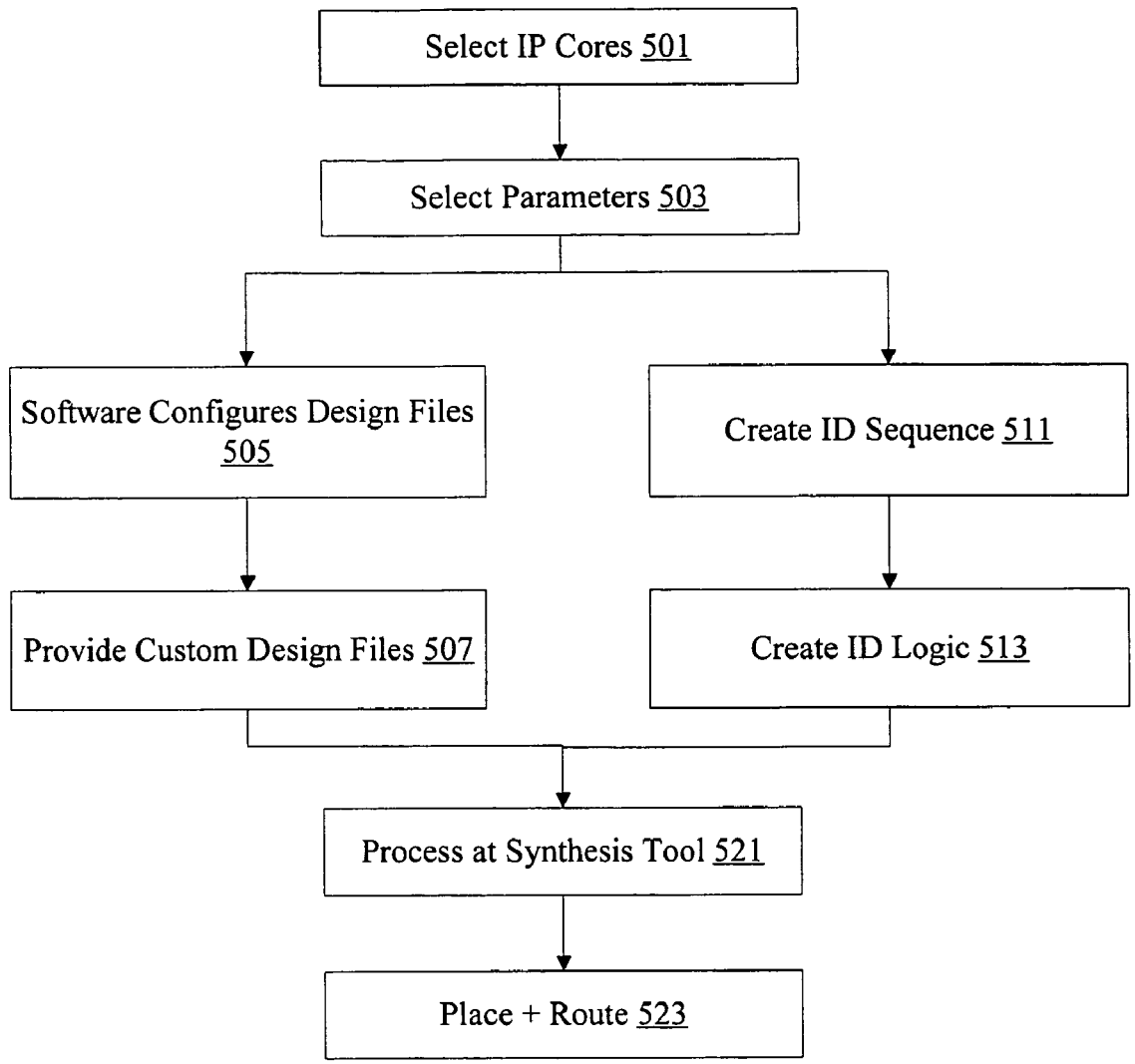
FIG. 5 is a flow process diagram showing a technique for providing identification information.

FIG. 5 a flow process diagram showing one technique for embedding identification information on a programmable device. At 501, IP cores are selected by a user from a database such as an IP core library. At 503, parameters are selected for the various IP cores. According to various embodiments, each IP core or component has a particular associated parameter set. Parameters may be selected using a variety of interfaces including text, file and graphical interfaces. At 511, an ID sequence is created. The ID sequence can include version numbers, parameters, codes, or other design notes for the various parameterized components. At 513, ID logic is created to allow a embedding of the ID sequence on a programmable chip. According to various embodiments, ID logic allows the synthesis and place and route of lookup tables providing for the retrieval of a particular ID sequence.

At 505, software configures design files to include both the selected IP cores and the selected parameter sets. The parameters may be provided as a wrapper around IP cores or may be integrated into the IP cores themselves. At 507, custom design files are provided during the programmable chip implementation process. At 521, the custom design files and the embedded identification logic 513 is processed at a synthesis tool. According to various embodiments, other custom logic can also be processed at the synthesis tool. At 523, the synthesized file is placed and routed to allow for implementation of the device having embedded identification information.

Although the techniques and mechanisms of the present invention are applicable to a variety of different devices including general purpose processors, video accelerators, cryptography accelerators, digital signal processors, microcontrollers, etc., the techniques and mechanisms of the present invention are particularly applicable to programmable chips. Programmable chips with configurable components often are customized by users but have no available mechanism for making customization information available.

Figure 6:
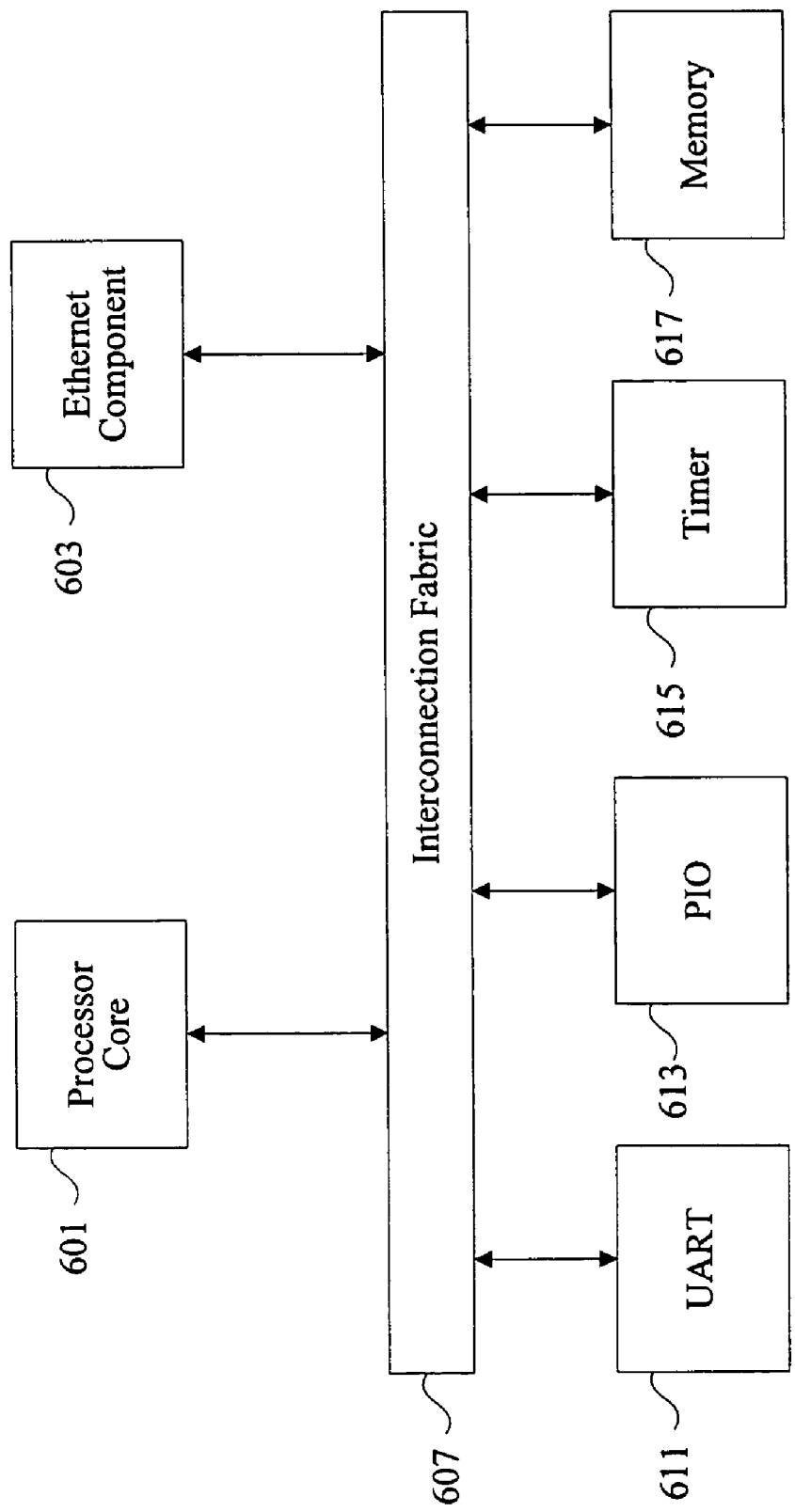
FIG. 6 is a diagrammatic representation showing a programmable chip system.

FIG. 6 is a diagrammatic representation showing one example of a system on a programmable chip that can be used to implement the techniques of the present invention. The system includes a processor core, a hardware accelerator, peripheral devices, and peripheral interfaces. Peripheral devices and peripheral interfaces are herein referred to as components. The system on a programmable chip includes processor core 601 and an Ethernet component 603 as well as peripheral components UART 611, PIO 613, timer 615, and data memory 617. In some examples, the Ethernet component 103 is instead a Digital Signal Processing (DSP) core, a cryptography accelerator, or a video processor. It should be noted that the system can include both on-chip memory 617 and off-chip memory. In one example, the data memory 617 can support variable latency or fixed latency access. The components are interconnected using an interconnection fabric 607. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of lookup tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The techniques and mechanisms of the present invention allow the implementation of a system on a programmable chip from a high-level language program. In one example, variable latency and fixed latency can be supported on a system using a conventional bus architecture.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor can not access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 7:
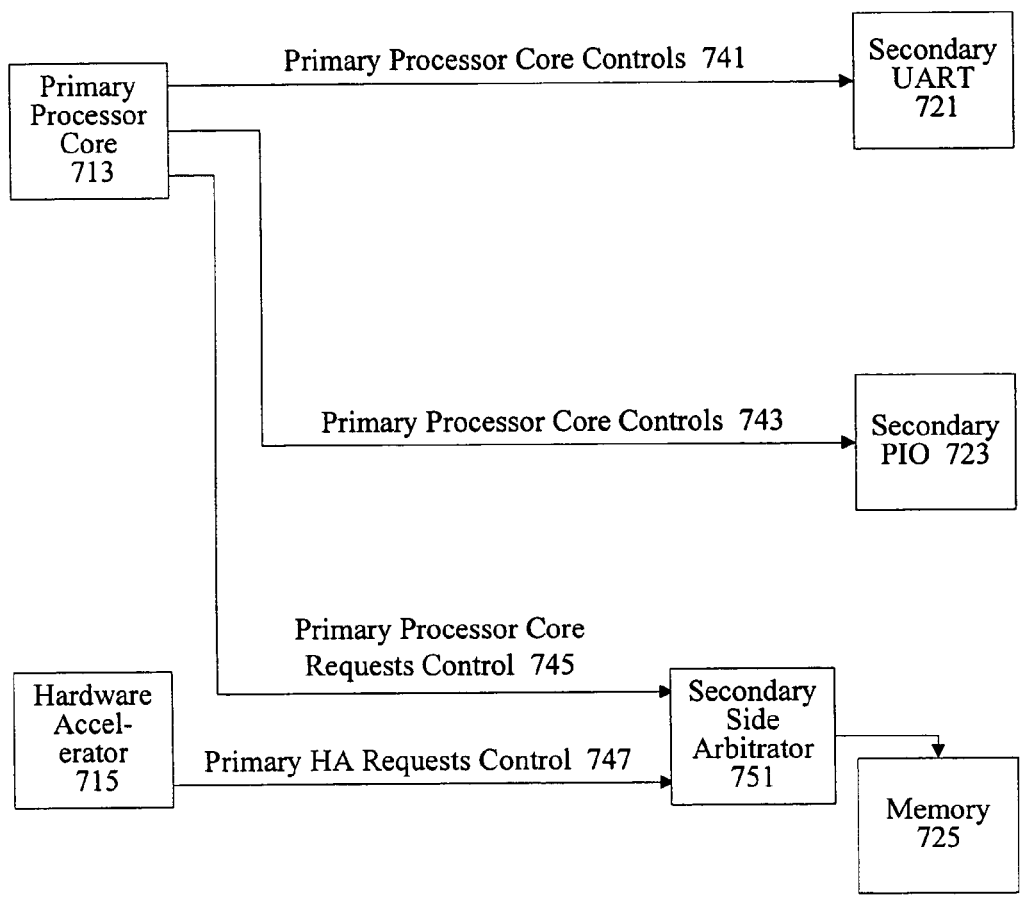
FIG. 7 is a diagrammatic representation showing an interconnection fabric.

FIG. 7 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as peripheral interface 725 is associated with a secondary side arbitrator 751. However, secondary components UART 721 and PIO 723 are not associated with any arbitrator. In one example, secondary component UART 721 and secondary PIO 723 can only be accessed by primary CPU 713 and not by primary Ethernet device 715. A secondary memory component 725, however, can be accessed by both primary CPU 713 and primary Ethernet device 715.

According to various embodiments, a secondary side arbitrator 751 allows a first secondary component in a system to be accessed by a first primary component at the same time a second secondary component in the system is accessed by a second primary component. For example, peripheral interface 725 can be accessed by primary Ethernet 715 through secondary side arbitrator 751 at the same time, secondary UART 721 is accessed by primary CPU 713.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 8:
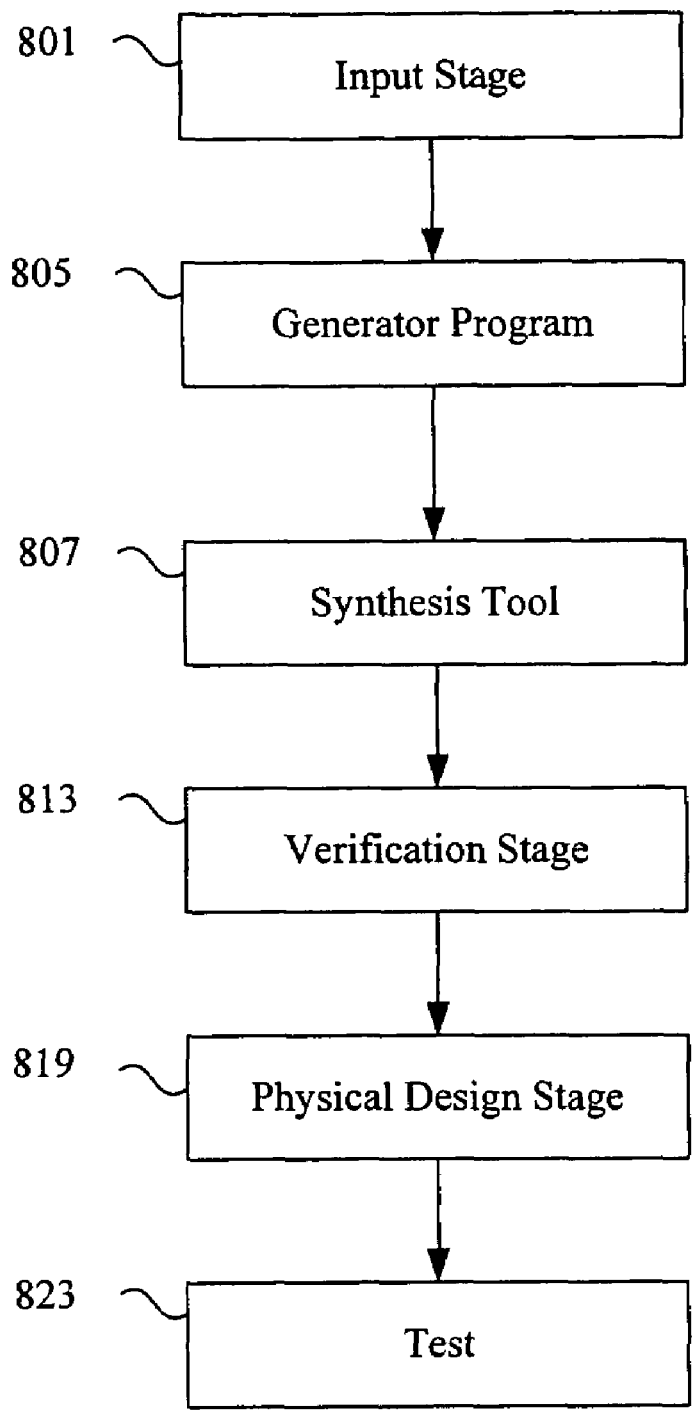
FIG. 8 is a diagrammatic representation showing a technique for implementing the programmable chip.

FIG. 8 is a diagrammatic representation showing implementation of a system on a programmable chip. An input stage 801 receives selection information typically from a user for logic such as a processor core as well as other components such as a streaming output device to be implemented on an electronic device. In one example, the input received is in the form of a high-level language program. A generator program 805 creates a logic description and provides the logic description along with other customized logic to any of a variety of synthesis tools, place and route programs, and logic configuration tools to allow a logic description to be implemented on an electronic device.

In one example, an input stage 801 often allows selection and parameterization of components to be used on an electronic device. The input stage 801 also allows configuration of variable or fixed latency support. In some examples, components provided to an input stage include intellectual property functions, megafunctions, and intellectual property cores. The input stage 801 may be a graphical user interface using wizards for allowing efficient or convenient entry of information. The input stage may also be a text interface or a program reading a data file such as a spreadsheet, database table, or schematic to acquire selection information. The input stage 801 produces an output containing information about the various modules selected.

In typical implementations, the generator program 805 can identify the selections and generate a logic description with information for implementing the various modules. The generator program 805 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 805 identifies pointers and provides ports for each pointer. One tool with generator program capabilities is System on a Programmable Chip (SOPC) Builder available from Altera Corporation of San Jose, Calif. The generator program 805 also provides information to a synthesis tool 807 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 809.

As will be appreciated by one of skill in the art, the input stage 801, generator program 805, and synthesis tool 807 can be separate programs. The interface between the separate programs can be a database file, a log, or simply messages transmitted between the programs. For example, instead of writing a file to storage, the input stage 801 can send messages directly to the generator program 805 to allow the generator program to create a logic description. Similarly, the generator program can provide information directly to the synthesis tool instead of writing HDL files. Similarly, input stage 801, generator program 805, and synthesis tool 807 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 807.

A synthesis tool 807 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 813 typically follows the synthesis stage 807. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 813, the synthesized netlist file can be provided to physical design tools 819 including place and route and configuration tools. A place and route tool typically locates logic cells on specific logic elements of a target hardware device and connects wires between the inputs and outputs of the various logic elements in accordance with logic required to implement an electronic design. The device can also be physically tested at 823.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 801, the generator program 805, the synthesis tool 807, the verification tools 813, and physical design tools 819 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 9:
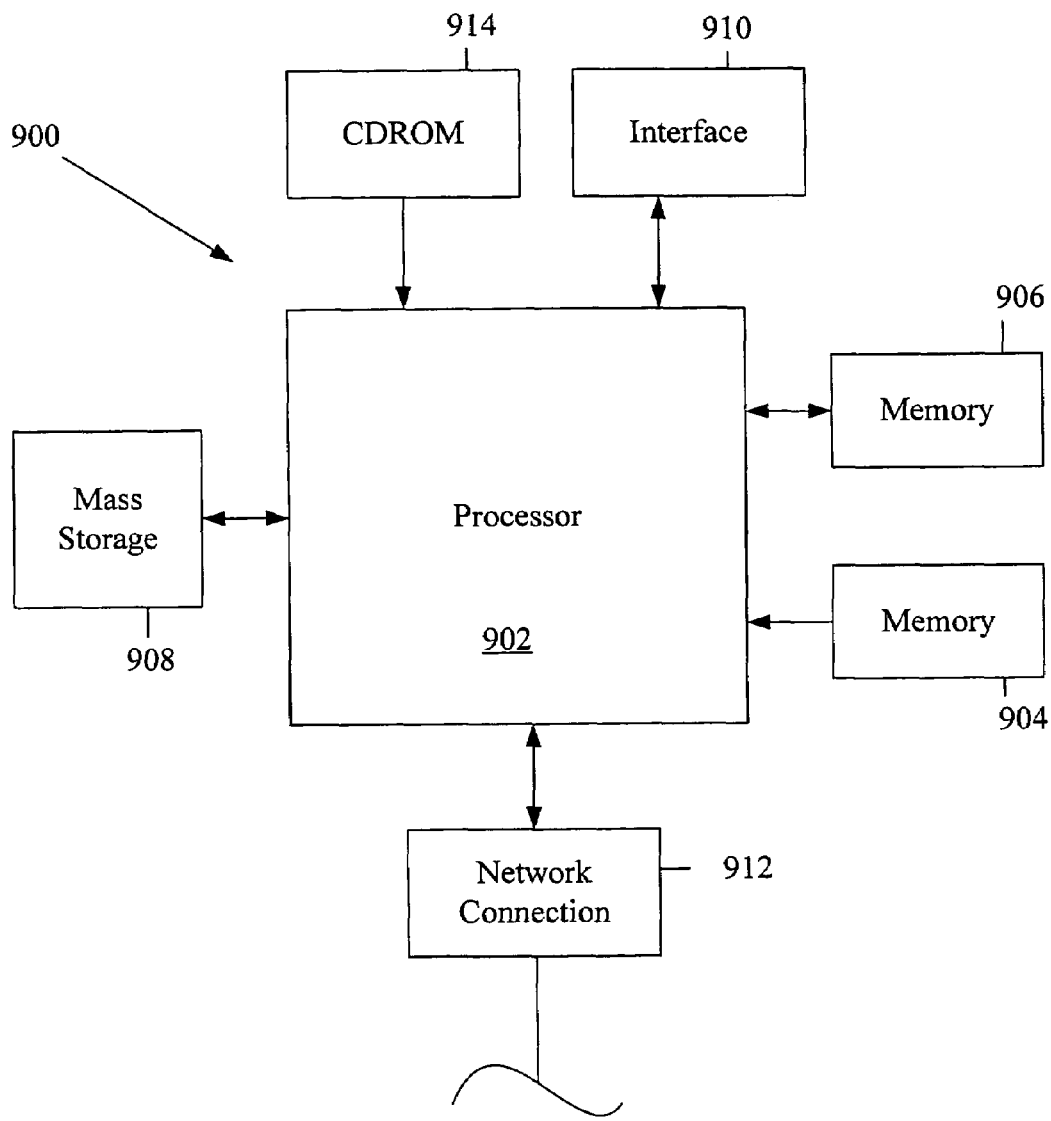
FIG. 9 is a diagrammatic representation depicting a computer system.

FIG. 9 illustrates a typical computer system that can be used to implement a programmable chip having shared I/O lines. The computer system 900 includes any number of processors 902 (also referred to as central processing units, or CPUs) that are coupled to devices including memory 906 (typically a random access memory, or "RAM"), memory 904 (typically a read only memory, or "ROM"). The processors 902 can be configured to generate a test sequences for any designated processor. As is well known in the art, memory 904 acts to transfer data and instructions uni-directionally to the CPU and memory 906 is used typically to transfer data and instructions in a bi-directional manner.

Both of these memory devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than memory. The mass storage device 908 can be used to hold a library or database of prepackaged logic or intellectual property functions, as well as information on generating particular configurations. It will be appreciated that the information retained within the mass storage device 908, may, in appropriate cases, be incorporated in standard fashion as part of memory 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. It should be noted that the system 900 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 908 or 914 and executed on CPU 908 in conjunction with primary memory 906.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A method for implementing a programmable chip, the method comprising:
   receiving intellectual property core information identifying a plurality of intellectual property cores for implementation on a programmable chip;
   receiving parameter information associated with the plurality of intellectual property cores for implementation on the programmable chip;
   generating custom design files for implementing the plurality of intellectual property cores parameterized using parameter information on the programmable chip;
   generating an identification sequence, the identification sequence configured to provide information identifying the plurality of intellectual property cores and parameters used to parameterized the plurality of intellectual property cores;
   implementing the plurality of intellectual property cores parameterized using parameter information on the programmable chip using a first plurality of lookup tables;
   writing the identification sequence to a second plurality of lookup tables.

2. The method of claim 1, further comprising:
   providing the identification sequence to a synthesis tool.

3. The method of claim 2, wherein the identification sequence is provided to the synthesis tool as identification logic.

4. The method of claim 3, wherein the identification logic is combined with custom design files associated with parameterized intellectual property cores for implementation on the programmable chip.

5. The method of claim 1, further comprising:
   providing the identification sequence to a place and route tool.

6. The method of claim 5, wherein the identification sequence is provided to the place and route tool as synthesized identification logic.

7. The method of claim 6, wherein the synthesized identification logic is combined with synthesized logic associated with parameterized intellectual property cores for implementation on the programmable chip.

8. The method of claim 1, wherein the identification sequence is a sequence of bits.

9. The method of claim 1, wherein the identification sequence is a bit string including a version code and a plurality of parameter values.

10. The method of claim 9, wherein the identification sequence includes an intellectual property order code.

11. The method of claim 1, wherein the identification sequence is read from the programmable chip in parallel by software access to the programmable chip during operation.

12. The method of claim 11, wherein the second plurality of lookup tables holding the identification sequence are accessed using an address bus and provide the identification sequence using a data bus.

13. The method of claim 12, wherein the second plurality of lookup tables includes three input and four input lookup tables.

14. The method of claim 1, wherein the identification sequence is read from the programmable chip using a JTAG interface.

15. The method of claim 1, wherein the identification sequence is read from the programmable chip using SignalTap, SignalProbe, or a programmable chip pin.

16. The method of claim 1, wherein the identification sequence is a bit sequence uniquely associated with selected parameters and intellectual property cores.

17. A programmable device, comprising:
   a plurality of components, the plurality of component implemented using a first plurality of lookup tables and associated logic;
   an interconnection fabric allowing communication between the plurality of components;
   embedded identification information associated with the plurality of components, the embedded identification information identifying the plurality of components and version information associated with the plurality of components, the embedded identification information implemented using a second plurality of lookup tables.

18. The programmable device of claim 17, wherein the interconnection fabric is a bus.

19. The programmable device of claim 17, wherein the interconnection fabric is a simultaneous multiple primary component fabric.

20. The programmable device of claim 17, wherein the embedded identification information further provides parameter information associated with the plurality of components.

21. The programmable device of claim 17, wherein the identification information is a sequence of bits.

22. The programmable device of claim 17, wherein the identification information is stored using lookup tables associated with logic elements.

23. The programmable device of claim 22, wherein the second plurality of lookup tables holding the identification sequence are accessed using an address bus and provide the identification sequence using a data bus.

24. The programmable device of claim 22, wherein the second plurality of lookup tables include four input lookup tables.

25. The programmable device of claim 17, wherein the identification information is read from the programmable chip in parallel by software access to the programmable chip during operation.

26. The programmable device of claim 17, wherein the plurality of components includes intellectual property cores obtained from an intellectual property library.

27. The programmable device of claim 17, wherein the identification information is read from the programmable device using a JTAG interface.

28. An apparatus for implementing a programmable chip, the apparatus comprising:
  means for receiving intellectual property core information identifying a plurality of intellectual property cores for implementation on a programmable chip;
  means for receiving parameter information associated with the plurality of intellectual property cores for implementation on the programmable chip;
  means for generating custom design files for implementing the plurality of intellectual property cores parameterized using parameter information on the programmable chip;
  means for generating an identification sequence, the identification sequence configured to provide information identifying the plurality of intellectual property cores and parameters used to parameterized the plurality of intellectual property cores;
  means for implementing the plurality of intellectual property cores parameterized using parameter information on the programmable chip using a first plurality of lookup tables;
  means for writing the identification sequence to a second plurality of lookup tables.

29. The apparatus of claim 28, further comprising:
  means for providing the identification sequence to a synthesis tool.

* * * * *